(12) United States Patent
Kawasaki et al.

(10) Patent No.: US 10,724,636 B2
(45) Date of Patent: Jul. 28, 2020

(54) COMBINED OIL RING

(71) Applicant: NIPPON PISTON RING CO., LTD., Saitama-shi, Saitama (JP)

(72) Inventors: Masataka Kawasaki, Saitama (JP); Mamoru Miyamoto, Saitama (JP); Hideshi Hitosugi, Saitama (JP); Kenji Arai, Saitama (JP)

(73) Assignee: NIPPON PISTON RING CO., LTD., Saitama-shi, Saitama (JP)

( * ) Notice: Subject to any disclaimer, the term of this patent is extended or adjusted under 35 U.S.C. 154(b) by 0 days.

(21) Appl. No.: 15/329,282

(22) PCT Filed: Jul. 22, 2015

(86) PCT No.: PCT/JP2015/070831
§ 371 (c)(1),
(2) Date: Jan. 26, 2017

(87) PCT Pub. No.: WO2017/017499
PCT Pub. Date: Feb. 4, 2016

(65) Prior Publication Data
US 2017/0227126 A1    Aug. 10, 2017

(30) Foreign Application Priority Data

Jul. 31, 2014 (JP) .................................. 2014-157068
Apr. 17, 2015 (JP) .................................. 2015-085042

(51) Int. Cl.
*F16J 9/06*    (2006.01)
*F16J 9/20*    (2006.01)
*F02F 5/00*   (2006.01)

(52) U.S. Cl.
CPC ................. *F16J 9/064* (2013.01); *F02F 5/00* (2013.01); *F16J 9/06* (2013.01); *F16J 9/068* (2013.01); *F16J 9/20* (2013.01)

(58) Field of Classification Search
CPC ...................................... F16J 9/203; F16J 9/10
See application file for complete search history.

(56) References Cited

U.S. PATENT DOCUMENTS 2,291,876 A  *  8/1942  Carlton ..................... F16J 9/066
                                                        277/480
3,281,156 A  *  10/1966  Anderson ................ F16J 9/063
                                                        267/1.5

(Continued)

FOREIGN PATENT DOCUMENTS

JP    2002-323133 A       11/2002
JP    2002323133 A   *   11/2002

(Continued)

OTHER PUBLICATIONS

International Search Report of PCT/JP2015/070831 dated Oct. 6, 2015.

*Primary Examiner* — Kristina R Fulton
*Assistant Examiner* — L. Susmitha Koneru
(74) *Attorney, Agent, or Firm* — Muncy, Geissler, Olds & Lowe, P.C.

(57) ABSTRACT

Provided is a combined oil ring that further reduces engine oil consumption.
A combined oil ring attached to an oil ring groove of a piston includes: a pair of upper and lower side rails each formed into a flat annular shape, and having a slide contact part that comes into sliding contact with a cylinder; and a spacer expander arranged between the pair of upper and lower side rails. In at least the upper side rail of the pair of upper and lower side rails, a cross-sectional shape of the slide contact part along an axial direction of the piston is a tapered shape linearly spreading from upper to lower parts of the piston; the tapered shape is at an angle of 5 to 30 degrees with respect to a central axis of the spacer expander, and has a vertex of the tapered shape within 0.15 mm from a lower end (Continued)

of the side rail; and a part closer to the lower end than the vertex is formed into a curved shape having a curvature of R0.01 to 0.5.

10 Claims, 5 Drawing Sheets

(56) References Cited

U.S. PATENT DOCUMENTS

| | | | | |
|---|---|---|---|---|
| 5,195,758 A * | 3/1993 | Erway | .................. | F16J 9/066 267/1.5 |
| 2006/0273525 A1* | 12/2006 | Fiedler | .................. | F16J 9/206 277/434 |
| 2010/0090416 A1* | 4/2010 | Tomanik | .................. | F16J 9/14 277/499 |
| 2010/0176557 A1* | 7/2010 | Peter-Klaus | ............. | F16J 9/062 277/460 |
| 2011/0197757 A1* | 8/2011 | Hold | .................. | F16J 15/24 92/168 |
| 2011/0204575 A1* | 8/2011 | Langner | .................. | F16J 9/062 277/473 |
| 2011/0221141 A1* | 9/2011 | Ayuzawa | .................. | F16J 9/068 277/434 |
| 2012/0235359 A1* | 9/2012 | Gao | .................. | F16J 9/203 277/442 |
| 2013/0154196 A1* | 6/2013 | Sytsma | .................. | B23P 15/06 277/434 |
| 2014/0021686 A1* | 1/2014 | Takahashi | ............... | F16J 9/066 277/442 |

FOREIGN PATENT DOCUMENTS

| | | |
|---|---|---|
| JP | 2003-049705 A | 2/2003 |
| JP | 2007-504416 A | 3/2007 |
| WO | 2005/024277 A1 | 3/2005 |

* cited by examiner

COMBINED OIL RING

CROSS REFERENCE TO RELATED APPLICATIONS

This application is a National Stage of International Application No. PCT/JP2015/070831 filed Jul. 22, 2015, claiming priority based on Japanese Patent Application No. 2014-157068 filed Jul. 31, 2014 and Japanese Patent Application No. 2015-085042 filed Apr. 17, 2015, the contents of all of which are incorporated herein by reference in their entirety.

TECHNICAL FIELD

The present invention relates to a combined oil ring, and particularly to a three-piece combined oil ring including a pair of upper and lower side rails and a spacer expander arranged therebetween.

BACKGROUND ART

A conventionally known oil ring scrapes off excess engine oil attached to a cylinder inner wall surface of an internal combustion engine, and forms an appropriate oil film, to thereby prevent seizure of a piston resulting from operation of the internal combustion engine, and reduce wear of a slide contact surface between the oil ring and the cylinder. Various forms of such an oil ring have been known. For example, the following Patent Literature describes a combined oil ring including a pair of upper and lower side rails and a spacer expander arranged therebetween, in which working surfaces of the side rails, in cross-section, follow the asymmetrical shape of a polynomial of the second order in a first segment, with $h(x)=ax+bx2$, and after passing a supporting vertex $h(x)$ configured as an edge, in a third segment follow the asymmetrical shape of the function $h(x)=cx2$, with c as a multiple of b.

CITATION LIST

Patent Literature

Patent Literature 1: National Publication of International Patent Application No. 2007-504416

Additionally, as mentioned above, the combined oil ring scrapes off excess engine oil attached to a cylinder inner wall surface of an internal combustion engine, and forms an appropriate oil film, to thereby prevent seizure of a piston. However, since the engine oil attached to a combustion chamber of the internal combustion engine is burnt and discharged to the outside of the internal combustion engine as exhaust gas, it is necessary to surely scrape off excess engine oil while maintaining the sealing performance of a piston ring, to reduce oil consumption.

SUMMARY OF INVENTION

Technical Problem

Even though the shape of slide contact surfaces of side rails and the tension of piston rings are variously set in conventional combined oil rings to improve their ability of scraping off engine oil, there is an increasing demand for further reduction in oil consumption in the context of lower energy consumption and environmental issues. However, according to the shape of the oil ring described in the aforementioned Patent Literature 1, the contact area increases in the initial stage of the sliding contact. Hence, the engine oil scraping function cannot be fully exerted in some cases.

The present invention has been made in view of the above problem, and aims to provide a combined oil ring that further reduces engine oil consumption.

Solution to Problem

The combined oil ring of the present invention is attached to an oil ring groove of a piston and includes: a pair of upper and lower side rails each formed into a flat annular shape, and having a slide contact part that comes into sliding contact with a cylinder; and a spacer expander arranged between the pair of upper and lower side rails. The combined oil ring is characterized in that: in at least the upper side rail of the pair of upper and lower side rails, a cross-sectional shape of the slide contact part along an axial direction of the piston is a tapered shape linearly spreading from upper to lower parts of the piston; the tapered shape is at an angle of 5 to 30 degrees with respect to a central axis of the spacer expander, and has a vertex of the tapered shape within 0.15 mm from a lower end of the side rail; and a part closer to the lower end than the vertex is formed into a curved shape having a curvature of R0.01 to 0.5.

Also, in the combined oil ring of the present invention, it is preferable that in the lower side rail of the pair of upper and lower side rails, a cross-sectional shape of the slide contact part along the axial direction of the piston be a tapered shape linearly spreading from upper to lower parts of the piston.

Also, in the combined oil ring of the present invention, it is preferable that a cross-sectional shape of the lower side rail of the pair of upper and lower side rails along the axial direction of the piston be a barrel shape that is formed into an arc form.

Also, in the combined oil ring of the present invention, it is preferable that the pair of upper and lower side rails include a front and back detection means.

Also, in the combined oil ring of the present invention, it is preferable that at least one of the pair of upper and lower side rails and the spacer expander be subjected to surface treatment.

Advantageous Effects of Invention

In the combined oil ring of the present invention, a cross-sectional shape of at least the upper side rail of the pair of upper and lower side rails along an axial direction of the piston is a tapered shape linearly spreading from upper to lower parts of the piston; the tapered shape is at an angle of 5 to 30 degrees with respect to a central axis of the spacer expander, and has a vertex of the tapered shape within 0.15 mm from a lower end of the side rail; and a part closer to the lower end than the vertex is formed into a curved shape having a curvature of R0.01 to 0.5. Hence, oil consumption can be reduced further.

Also, in the combined oil ring of the present invention, in the lower side rail of the pair of upper and lower side rails, a cross-sectional shape of the slide contact part along the axial direction of the piston is a tapered shape linearly spreading from upper to lower parts of the piston. Hence, oil consumption can be reduced even more.

Also, in the combined oil ring of the present invention, a cross-sectional shape of the lower side rail of the pair of upper and lower side rails along the axial direction of the piston is a barrel shape that is formed into an arc form. Hence, it is possible to assemble the lower side rail without detecting the front or back thereof, and eliminate the complicated work of front-back detection.

Also, in the combined oil ring of the present invention, the pair of upper and lower side rails include the front-back detection means. Hence, when assembling the combined oil ring and installing the combined oil ring into the piston groove, it is possible to prevent erroneous installation due to mistaking of the front and back, and prevent increased oil consumption due to erroneous installation.

Also, in the combined oil ring of the present invention, the pair of upper and lower side rails are subjected to surface treatment. Hence, it is possible to reduce sliding resistance between the pair of upper and lower side rails and the cylinder, and suppress wear of the combined oil ring.

DESCRIPTION OF EMBODIMENT

Hereinafter, preferred embodiments for carrying out the present invention will be described with reference to the drawings. Note that the following embodiments do not limit aspects of the invention according to the claims, and not all of combinations of characteristics described in the embodiments are essential to solutions provided by the invention.

Figure 1:
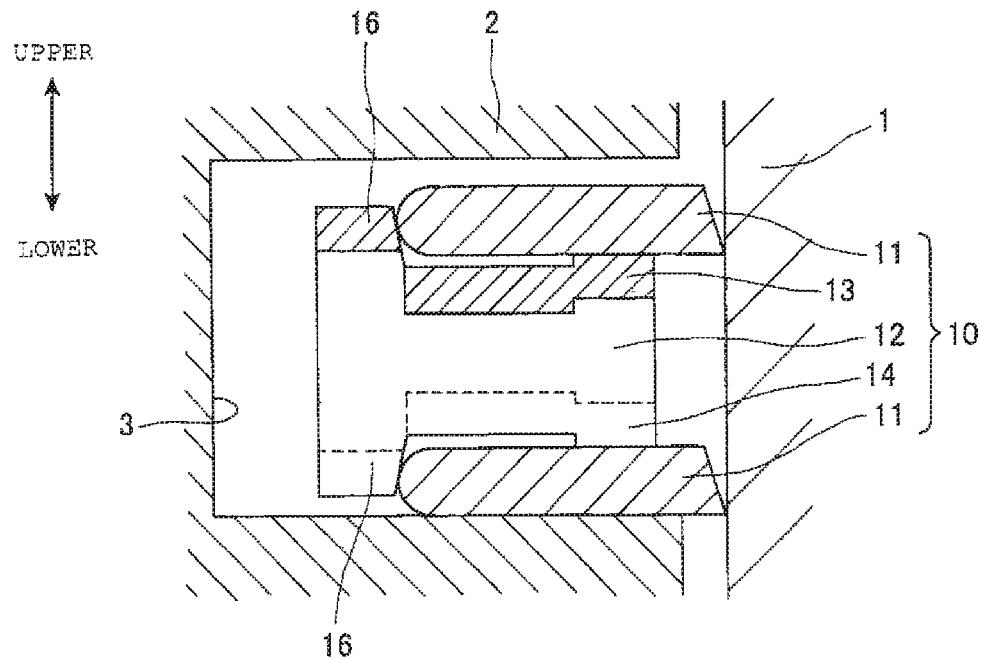
FIG. 1 is a cross-sectional view of a main part of an internal combustion engine into which a combined oil ring of an embodiment of the present invention is assembled, the cross-sectional view cut in the direction of a cylinder axis of the internal combustion engine.
Figure 2:
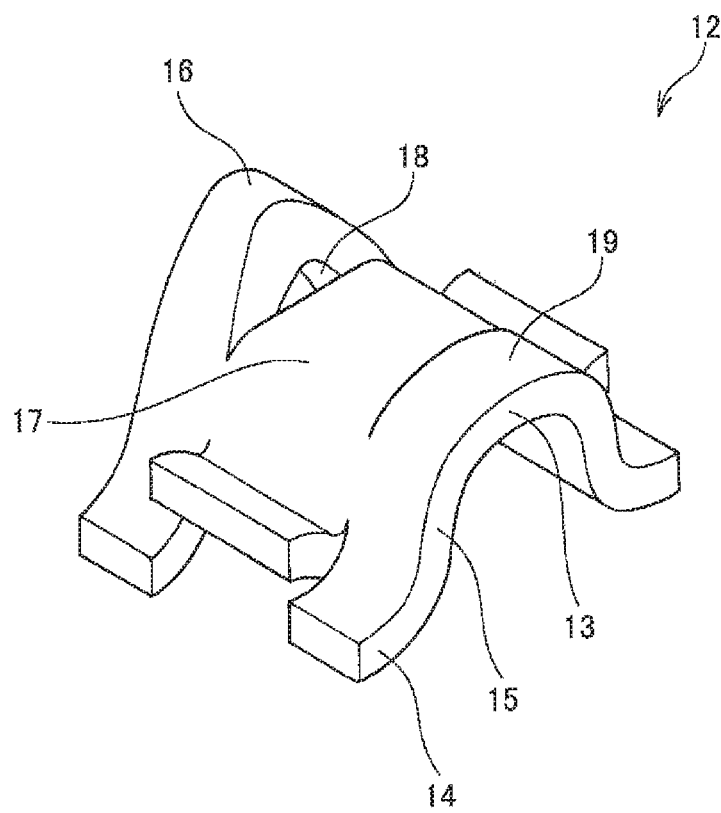
FIG. 2 is a perspective view showing a part of a spacer expander used in the combined oil ring of the embodiment of the present invention.
Figure 3:
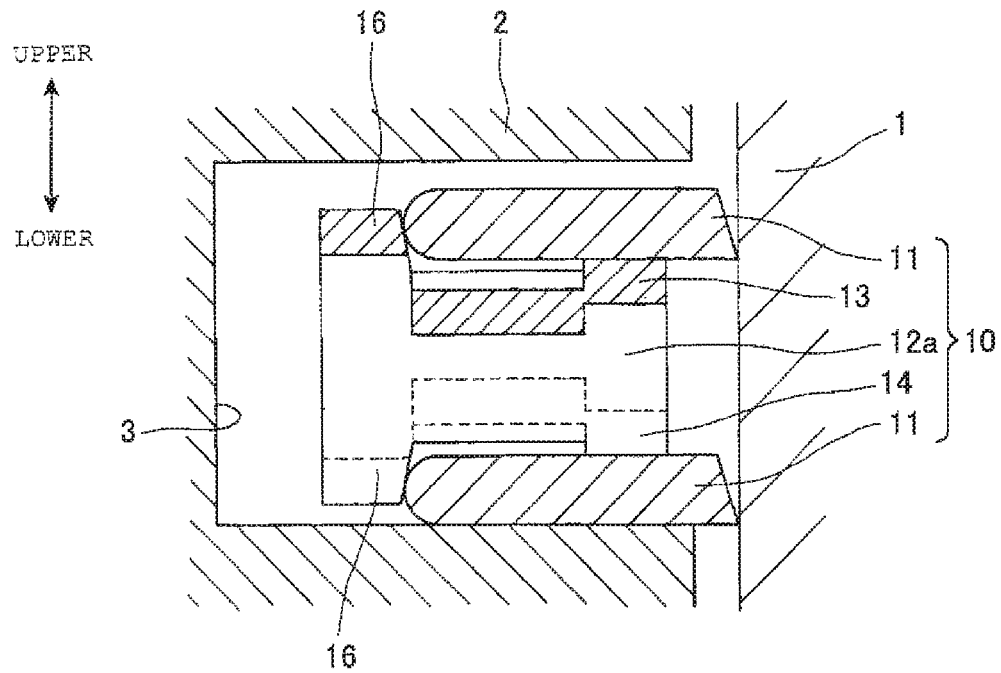
FIG. 3 is a cross-sectional view of a main part of an internal combustion engine to which a combined oil ring of another embodiment of the present invention is assembled, the cross-sectional view cut in the direction of a cylinder axis of the internal combustion engine.
Figure 4:
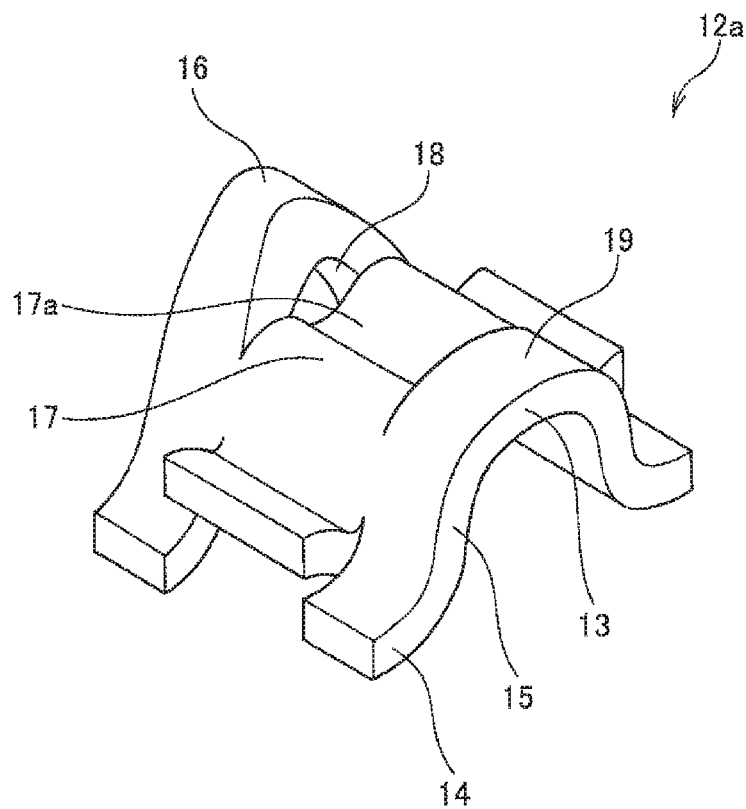
FIG. 4 is a perspective view showing a part of a spacer expander used in the combined oil ring of the other embodiment of the present invention.
Figure 7:
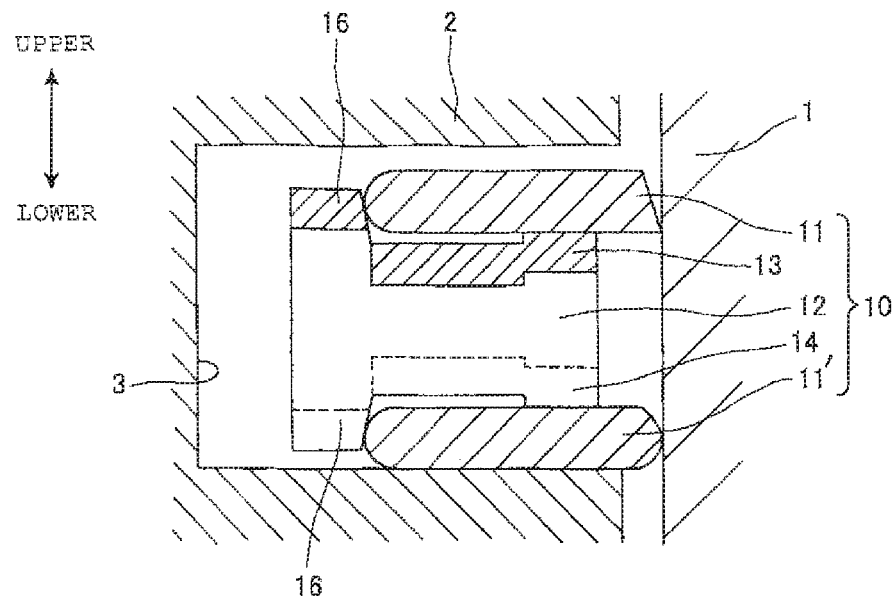
FIG. 7 is a cross-sectional view of a main part of a modification of the combined oil ring of the embodiment of the present invention.
Figure 8:
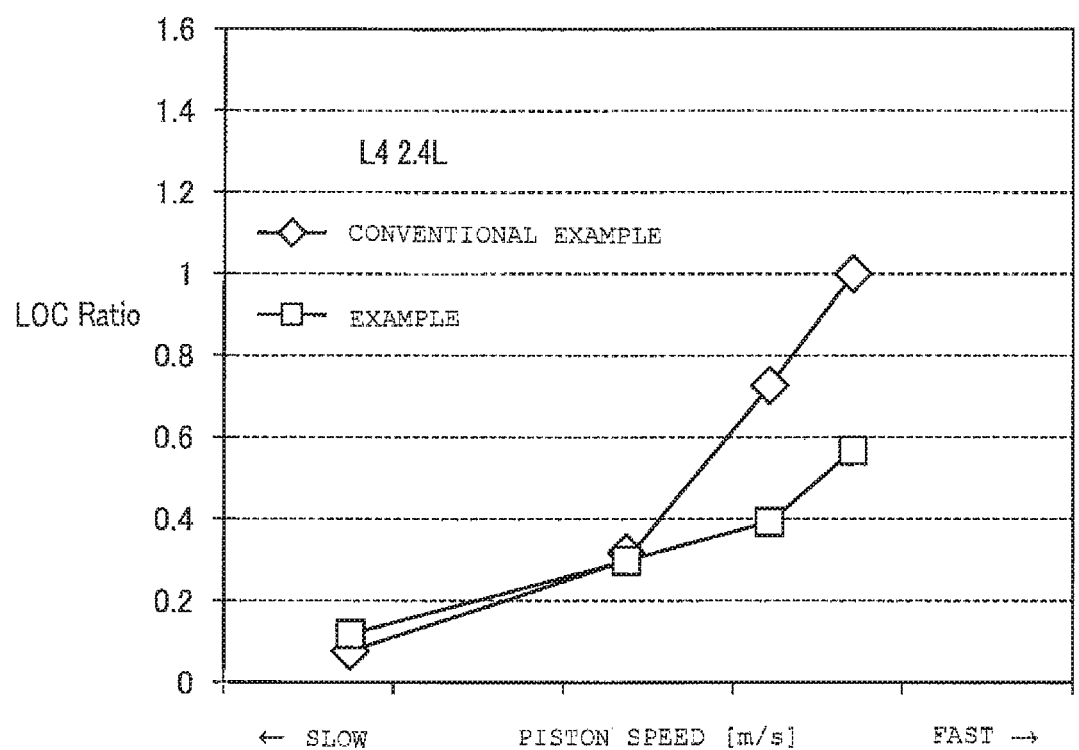
FIG. 8 is a graph showing oil consumption by the combined oil ring of the embodiment of the present invention.

FIG. 1 is a cross-sectional view of a main part of an internal combustion engine to which a combined oil ring of an embodiment of the present invention is assembled, the cross-sectional view cut in the direction of a cylinder axis of the internal combustion engine. FIG. 2 is a perspective view showing a part of a spacer expander used in the combined oil ring of the embodiment of the present invention. FIG. 3 is a cross-sectional view of a main part of an internal combustion engine to which a combined oil ring of another embodiment of the present invention is assembled, the cross-sectional view cut in the direction of a cylinder axis of the internal combustion engine. FIG. 4 is a perspective view showing a part of a spacer expander used in the combined oil ring of the other embodiment of the present invention. FIG. 5 shows cross-sectional views of side rails used in the combined oil ring of the embodiment of the present invention, the cross-sectional views cut in the direction of the cylinder axis of the internal combustion engine. FIG. 6 is a diagram of modifications of a front and back detection means of the combined oil ring of the embodiment of the present invention. FIG. 7 is a cross-sectional view of a main part of a modification of the combined oil ring of the embodiment of the present invention. FIG. 8 is a graph showing oil consumption by the combined oil ring of the embodiment of the present invention. Note that in the specification, the vertical direction is defined as a direction extending along upper and lower directions of the sheet in FIGS. 1 and 3.

As shown in FIG. 1, a combined oil ring 10 of the embodiment is assembled in an oil ring groove 3 formed on an outer circumferential surface of a piston 2 of an internal combustion engine, and is a member that comes into sliding contact with an inner wall of a cylinder 1 and scrapes off excess engine oil attached to the inner wall of the cylinder 1, to thereby form an appropriate oil film on the inner wall of the cylinder 1.

The combined oil ring 10 is configured of a pair of upper and lower side rails 11, 11, and a spacer expander 12 arranged between the pair of upper and lower side rails 11, 11. The side rails 11, 11 and the spacer expander 12 are made of steel, for example, and each side rails 11 is formed as a flat annular ring including a gap (not shown).

As shown in FIG. 2, the spacer expander 12 is formed by performing deformation processing on a steel material, has an irregular shape (corrugated shape) along the axial direction, and is formed into a substantially circular shape in the circumferential direction. The irregular shape in the axial direction forms upper pieces 13 and lower pieces 14 in an axial end part. Specifically, the spacer expander 12 includes many upper pieces 13 and lower pieces 14 spaced apart from one another in axial and circumferential directions, and arranged alternately in the circumferential direction. A coupling piece 15 couples an upper piece 13 with an adjacent lower piece 14.

In addition, as shown in FIG. 1, ear portions 16 respectively pushing the side rails 11, 11 to the outer circumferential side are each formed in such a manner as to stand in an arch shape in an inner circumferential end part of each of the upper piece 13 and the lower piece 14 of the spacer expander 12. Note that as shown in FIG. 2, a through hole 18 is formed along the radial direction in the ear portion 16.

Furthermore, as shown in FIG. 2, a groove 17 is formed along the radial direction on each of an upper surface of the upper piece 13 and a lower surface (not shown) of the lower piece 14. Additionally, a side rail support portion 19 formed a step higher than the groove 17 is provided, in an outer circumferential end part of each of the upper piece 13 and the lower piece 14 of the spacer expander 12.

Note that as shown in FIGS. 3 and 4, a spacer expander 12a may have, in a groove 17, a recess 17a whose cross-sectional shape along the radial direction is V-shaped or R-shaped. In this case, since the recess 17a increases the opening area of a through hole 18, it is possible to increase the flow rate of oil flowing through the through hole 18.

Thus, by forming the groove 17 in the spacer expander 12a, it is possible to smoothly circulate engine oil from the outer circumferential side to the inner circumferential side of the piston. With this, the engine oil scraped off by the piston ring can be circulated back into the engine, and also be kept from leaking into the combustion chamber, so that oil consumption (LOC) can be reduced.

Note that when the spacer expander 12 is assembled in the oil ring groove 3 of the piston 2, the spacer expander 12 is compressed in the circumferential direction with ends of the gap brought into contact with each other. Accordingly, the spacer expander 12 is assembled such that tension of the spacer expander 12 generates a radially outward expansion force. Hence, the side rail support portions 19, 19 of the upper pieces 13 and the lower pieces 14 separate the upper and lower side rails 11, 11 to upper and lower sides in the axial direction and hold them, while the ear portions 16 respectively push inner circumferential surfaces of the side rails 11 to bring outer circumferential surfaces of the upper and lower side rails 11, 11 into close contact with an inner wall surface of the cylinder 1.

Figure 5A:
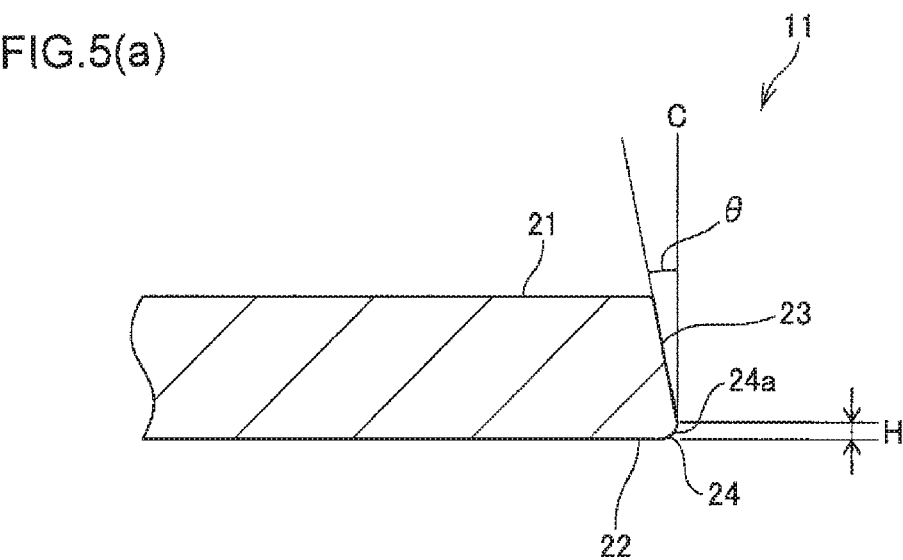
FIG. 5 shows cross-sectional views of side rails used in the combined oil ring of the embodiment of the present invention, the cross-sectional views cut in the direction of the cylinder axis of the internal combustion engine.

As shown in FIG. 5(a), at least the upper side rail 11 of the pair of upper and lower side rails includes a slide contact part that comes into sliding contact with the cylinder. The cross-sectional shape of the slide contact part along the axial direction of the piston 1 includes: a tapered shape in which a side surface 23 spreads linearly from a side rail-upper surface 21 to a side rail-lower surface 22; and a curved surface 24 curving at a predetermined curvature. In addition, in the cross-sectional shape, a vertex 24a is formed at the radially outermost end on the curved surface 24. Note that the vertex 24a is formed where a height H from the lower surface 22 of the side rail 11 is within 0.15 mm. Moreover, the curvature of the curved surface 24 is preferably set to R0.01 to 0.5 (mm).

Note that as shown in FIG. 1, the combined oil ring 10 is assembled such that the pair of upper and lower side rails 11, 11 are facing the same direction. Specifically, the pair of upper and lower side rails 11, 11 are both combined with the spacer expander 12 such that the vertex 24a is positioned on the lower end side, and thereby constitute the combined oil ring 10.

Figure 5B:
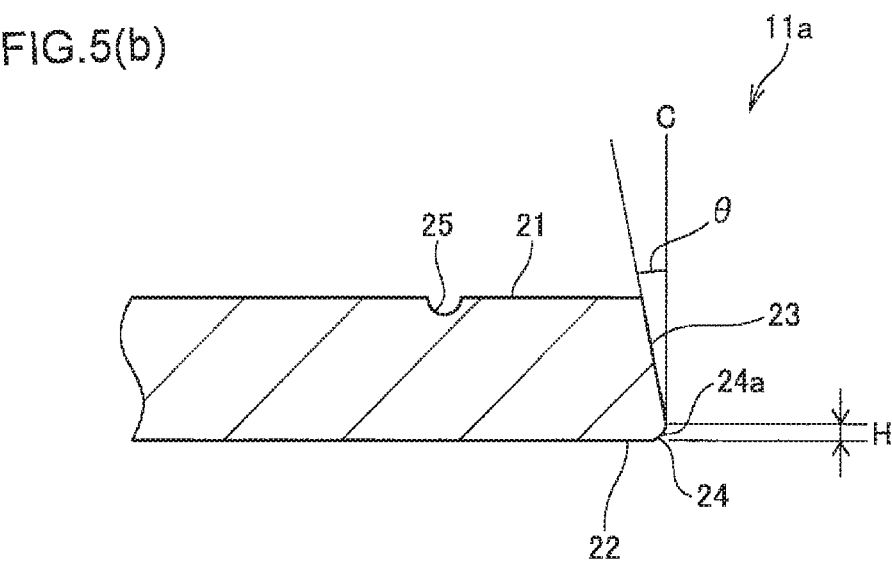

Furthermore, as shown in FIG. 5(b), a recess 25 as a front and back detection means may be formed on the side rail-upper surface 21. Since the recess 25 only needs to be capable of being detected by the side rail-upper surface 21, the recess 25 may be formed into an annular shape or a dot on the side rail-upper surface 11. Note that the recess 25 may be formed by pressing, punching, or laser cutting the side rail, or may be formed at the same time as a wire drawing process such as roll drawing and die drawing, for example. Moreover, instead of providing the recess 25, paint may be applied in an interrupted or continuous manner on the side rail-upper surface 21 or lower surface 22. Instead, the surface roughness of any one of the upper surface 21 and the lower surface 22 may be varied by smoothening the upper surface 21 and roughening the lower surface 22, for example, to detect the front and back by touching. In this case, since the detection does not depend on sight, it is possible to surely detect the front and back, even when there is not enough light in the workplace. Note that the side surface 23 is tilted at a predetermined angle θ with respect to a central axis C of the spacer expander 12. The angle θ is preferably set to 5 to 30 degrees, and more preferably set to 8 to 12 degrees.

Figure 6A:
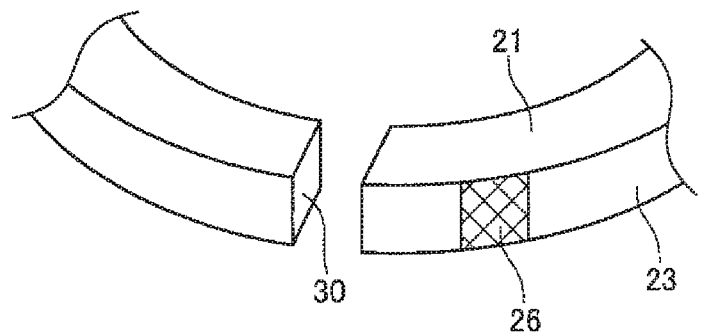
FIG. 6 is a diagram of modifications of a front and back detection means of the combined oil ring of the embodiment of the present invention.

Further, as shown in FIG. 6(a), various forms are applicable as the front-back detection means. For example, paint 26 may be applied on any one of the right and left of a gap 30 of a side surface 23 of a side rail. With this, it is possible to detect the front and back of the side rail, by always assembling the side rail such that the paint 26 is placed on the right side of the gap 30, for example.

Figure 6B:
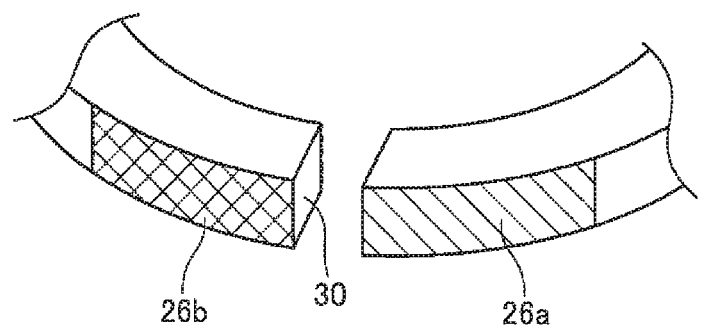

Also, as shown in FIG. 6(b), both sides of a gap 30 may be painted with first paint 26a applied on one side, and second paint 26b in a color different from the first paint 26a applied on the other side. If the first paint 26a is white and the second paint 26b is red, for example, it is possible to detect the front and back of a side rail, by assembling the side rail such that white is placed on the right.

Figure 6C:
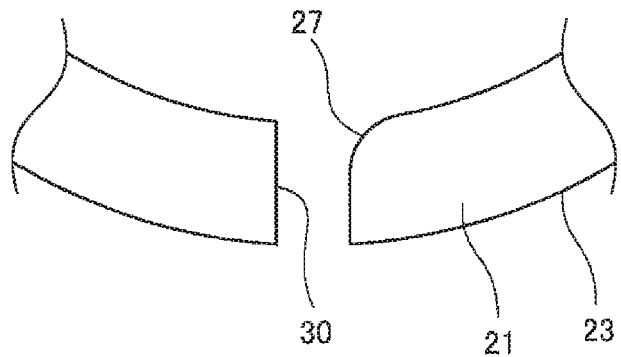

Also, as shown in FIG. 6(c), a chamfering 27 may be provided on one of inner circumferential end parts of a gap 30 on an end opposite to a side surface 23. With this, it is possible to detect the front and back of the side rail, by assembling the side rail such that the chamfering 27 is placed on the right side of the gap 30, for example.

Also, as shown in FIG. 7, the pair of upper and lower side rails may be formed such that an upper side rail 11 has a tapered shape, and an axial cross-section of a lower side rail 11' is a barrel shape that is formed into an arc form protruding in the radial direction. In this case, since the barrel shape can be assembled to the combined oil ring without detecting the front and back thereof, it is possible to lighten the workload of the aforementioned front-back detection.

EXAMPLE

Next, a functional test was performed for the combined oil ring 10 of the embodiment by use of an example and a comparative example, to describe the present invention in more detail. The functional test was performed by using a 2.4 L inline-four gasoline car engine. As test conditions, oil consumption (LOC) was measured for a conventional example (barrel shape) and the combined oil ring of the present invention at WOT (wide open throttle), so that the piston speed was 16 m/s to 23 m/s, and the results were verified by relative ratios where the value of the conventional example at 22.6 m/s is 1.

An ion plating film made of Cr—N was formed on slide contact surfaces of a top compression ring and side rails of an oil ring. After forming the ion plating film on each of the slide contact surfaces of the oil ring, lapping was performed thereon to smoothen projection parts and tapered parts on the slide contact surface. The position of a vertex 24a of a curved surface 24 was not more than 0.15 mm from a side rail-lower surface 22.

Note that other test conditions were as follows.
Piston bore diameter: 87 mm,
shape of slide contact surface of top compression ring: barrel-faced, and
shape of slide contact surface of second compression ring: tapered and undercut.

In the test, side rails 11 formed as in FIG. 5(a), and a spacer expander formed as in FIG. 2 were used as an example. Dimensions of the oil ring were as follows.
EA of spacer expander: 10 degrees,
radial thickness of side rail: 1.9 mm,
axial thickness of side rail: 0.4 mm,
outer angle θ of side rail: 10 degrees, and
axial width of oil ring: 2.0 mm.

As shown in FIG. 8, it has been verified that when compared with the comparative example at piston speeds of 22 m/s and 22.6 m/s, the example reduced oil consumption by approximately 40% from conventional one.

Note that while placement of the vertices of the pair of side rails on the lower side as in the example reduces oil consumption significantly, it has been verified that placement of the vertices of the side rails on the upper side causes frequent scraping up of oil, and therefore increases oil consumption.

Thus, by comparing oil consumption by the conventional combined oil ring using the barrel-shaped side rail and oil consumption by the combined oil ring 10 of the embodiment, it has been verified that the shape of the embodiment has an effect of suppressing oil consumption by approximately 40%.

Additionally, the side rails of the combined oil ring 10 of the above-mentioned embodiments may be surface-treated with DLC (Diamond Like Carbon), for example. Also, as the front-back detection means, in addition to forming the recess 25 as in FIG. 5(b), a pattern may be provided on any one of the side rail-upper surface 21 and the side rail-lower surface 22. It is clear from the description of the scope of claims, that such modified or improved forms may be included in the technical scope of the present invention.

REFERENCE SIGNS LIST 1 cylinder, 2 piston, 3 oil ring groove, 10 combined oil ring, 11 side rail, 12 spacer expander, 21 side rail-upper surface, 22 side rail-lower surface,
23 side surface, 24 curved surface 24a vertex,
25 recess.

The invention claimed is:

1. A combined oil ring attached to an oil ring groove of a piston that is configured to move along a sliding surface of a cylinder, comprising:
a pair of upper and lower side rails, each formed into a flat annular shape, and having a top surface, a bottom surface, and a side surface extending from the top surface to the bottom surface, the top surface and the bottom surface being parallel to each other and extending in a direction perpendicular to an axial direction of the combined oil ring; and
a spacer expander arranged between the pair of upper and lower side rails and comprising:
a plurality of upper pieces and lower pieces that are alternately and adjacently arranged in a circumferential direction so as to be spaced apart in the axial direction and the circumferential direction; and
coupling pieces that respectively couple each upper piece to the adjacent lower piece, wherein:
in at least the upper side rail of the pair of upper and lower side rails, the side surface includes a linearly tapered surface, a curved surface and a vertex connecting the linearly tapered surface to the curved surface, a cross-sectional shape of the linearly tapered surface along an axial direction of the piston is a tapered shape linearly spreading from the upper surface of the upper side rail to the vertex,
the vertex being a slide contact part that is configured to come into sliding contact with the sliding surface of the cylinder;
an angle formed by the linearly tapered surface and the sliding surface of the cylinder is at an angle of 8 to 12 degrees,
the vertex is positioned within 0.15 mm from a lower end of the side rail; and
a curvature of the curved surface is R0.01 to 0.5 mm.

2. The combined oil ring according to claim 1, wherein the side surface of the lower side rail of the pair of upper and lower side rails has a shape that corresponds to a shape of the side surface of the upper side rail.

3. The combined oil ring according to claim 1, wherein a cross-sectional shape of the side surface of the lower side rail of the pair of upper and lower side rails along the axial direction of the piston is a barrel shape that is formed into an arc form.

4. A combined oil ring attached to an oil ring groove of a piston comprising:
a pair of upper and lower side rails, each formed into a flat annular shape, and having a taper surfaced and a slide contact part that comes into sliding contact with a cylinder; and
a spacer expander arranged between the pair of upper and lower side rails and comprising:
a plurality of upper pieces and lower pieces that are alternately and adjacently arranged in a circumferential direction so as to be spaced apart in an axial direction and the circumferential direction: and
coupling pieces that respectively couple each upper piece to the adjacent lower piece wherein:
in at least the upper side rail of the pair of upper and lower side rails, a cross-sectional shape of the taper surface along an axial direction of the piston is a tapered shape linearly spreading from upper to lower parts of the piston;
the taper surface is at an angle of 8 to 12 degrees with respect to a central axis of the spacer expander, and has a vertex of the tapered shape within 0.15 mm from a lower end of the side rail; and
a part closer to the lower end than the vertex is formed into a curved shape having a curvature of R0.01 to 0.5 mm
a front and back detection means is provided on the taper surface of the pair of upper and lower side rails.

5. The combined oil ring according to claim 1, wherein at least one of the pair of upper and lower side rails and the spacer expander is subjected to surface treatment.

6. The combined oil ring according to claim 1, wherein the spacer expander further comprising side rail support parts that are respectively formed in an outer circumferential end portion of each of the upper pieces and the lower pieces so as to be one step higher than one of the grooves,
wherein an upper surface of each upper piece and a lower surface of each lower piece include a groove formed thereon, and
wherein a cross-sectional shape of the groove along the radial direction is V-shaped.

7. The combined oil ring according to claim 1, wherein the vertex of the upper side rail is positioned closer to the bottom surface than the top surface of the upper side rail.

8. The combined oil ring according to claim 1, wherein an angle formed by the bottom surface and the side surface of the upper side rail is 78-82 degrees.

9. The combined oil ring according to claim 1, wherein the upper side rail has an inner circumferential surface, and
the upper side rail is capable of wobbling while the piston moves in a direction from the lower side rail to the upper side rail, the side surface of the upper side rail is positioned closer to the lower side rail than the inner circumferential surface of the upper side rail is.

10. A combined oil ring attached to an oil ring groove of a piston that is configured to move along a sliding surface of a cylinder, comprising:
a pair of upper and lower side rails, each formed into a flat annular shape, and having a top surface, a bottom surface, and a side surface extending from the top surface to the bottom surface, the top surface and the bottom surface being parallel to each other and extending in a direction perpendicular to an axial direction of the combined oil ring; and a spacer expander arranged between the pair of upper and lower side rails, wherein:

in at least the upper side rail of the pair of upper and lower side rails, the side surface includes a linearly tapered surface, a curved surface and a vertex connecting the linearly tapered surface to the curved surface, a cross-sectional shape of the linearly tapered surface along an axial direction of the piston is a tapered shape linearly spreading from the upper surface of the upper side rail to the vertex, the vertex being a slide contact part that is configured to come into sliding contact with the sliding surface of the cylinder;

an angle formed by the linearly tapered surface and the sliding surface of the cylinder is at an angle of 8 to 12 degrees, the vertex is positioned within 0.15 mm from a lower end of the side rail; and a curvature of the curved surface is R0.01 to 0.5 mm.

\* \* \* \* \*